Figure 1:
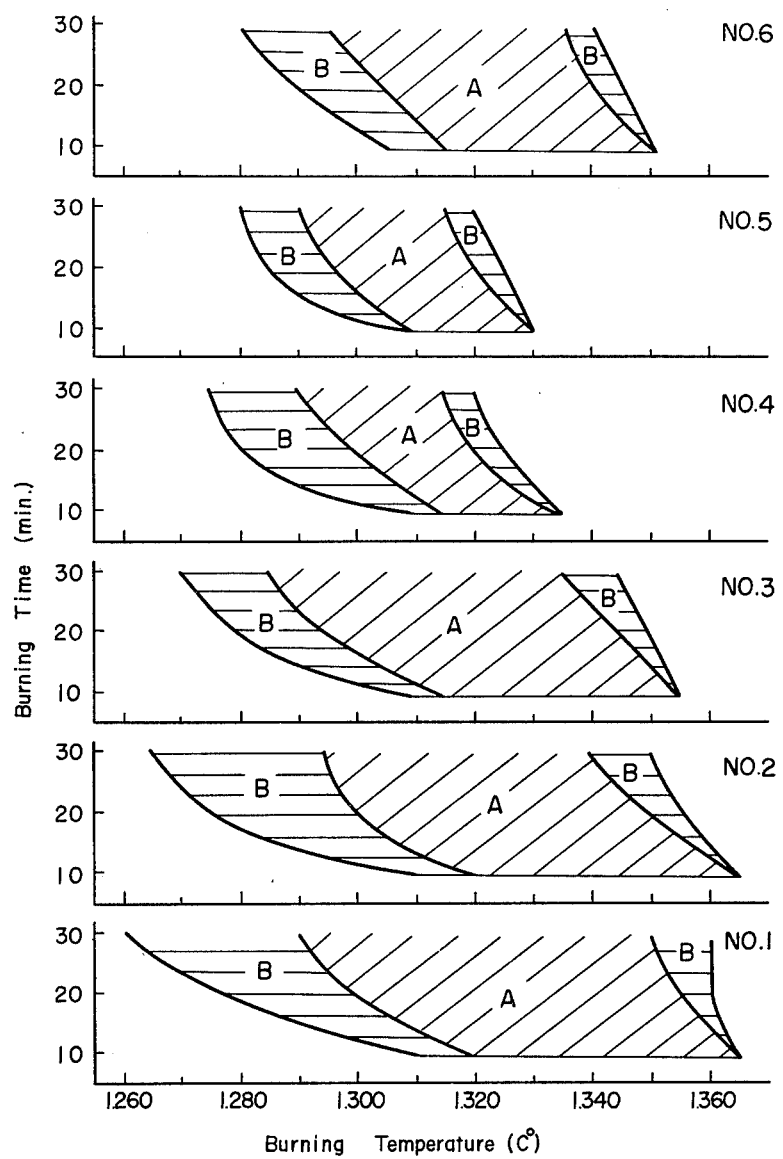

United States Patent [19]

Mori et al.

[11] 4,028,126
[45] June 7, 1977

[54] PROCESS FOR MANUFACTURING RAPID HARDENING PORTLAND CEMENT CLINKER

[75] Inventors: Shigejiro Mori, Kawasaki; Hiroshi Uchikawa, Funabashi; Shunichiro Uchida, Tokyo, all of Japan

[73] Assignee: Onoda Cement Company, Ltd., Yamaguchi, Japan

[22] Filed: Jan. 7, 1974

[21] Appl. No.: 431,157

Related U.S. Application Data

[63] Continuation of Ser. No. 208,068, Dec. 15, 1971, abandoned.

[30] Foreign Application Priority Data

Dec. 28, 1970 Japan .............................. 46-120519

[52] U.S. Cl. ................................. 106/100; 106/104
[51] Int. Cl.$^2$ ......................................... C04B 7/54
[58] Field of Search ............. 106/89, 100, 315, 104

[56] References Cited

UNITED STATES PATENTS

| | | | |
|---|---|---|---|
| 3,381,064 | 4/1968 | Yamaguchi et al. | 106/100 |
| 3,402,225 | 9/1968 | Cameron et al. | 106/100 |
| 3,628,973 | 12/1971 | Greening et al. | 106/89 |
| 3,677,781 | 7/1972 | Nickelsen et al. | 106/100 |

*Primary Examiner*—J. Poer
*Attorney, Agent, or Firm*—Oblon, Fisher, Spivak, McClelland & Maier

[57] ABSTRACT

A process for manufacturing a rapid hardening portland cement clinker containing a calcium haloaluminate having the formula; $11CaO \cdot 7Al_2O_3 \cdot CaX_2$, in which X is a halogen, characterized by adding at least one sulfur compound selected from calcium sulfate, calcium sulfite and calcium sulfide to the mixed raw materials comprising mainly an aluminous material, a calcareous material, a silicious material, an iron source and a halogen source, and burning the obtained mixture in an oxidizing temperature.

9 Claims, 5 Drawing Figures

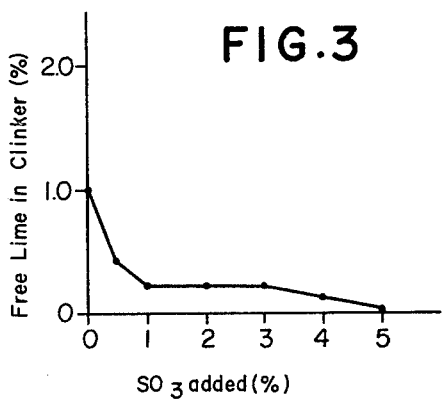
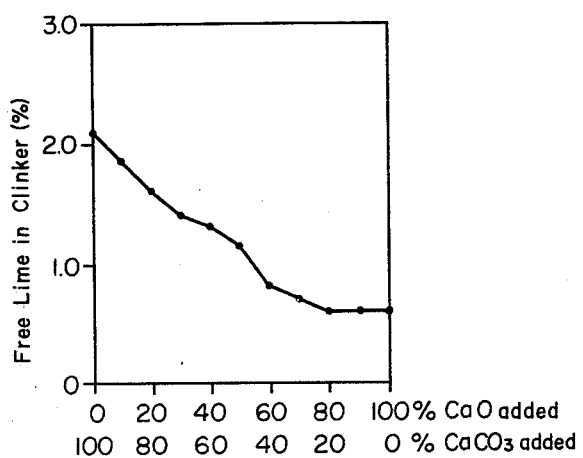

PROCESS FOR MANUFACTURING RAPID HARDENING PORTLAND CEMENT CLINKER

This is a continuation of application Ser. No. 208,068, filed December 15, 1971, now abandoned.

This invention relates to a process for manufacturing rapid hardening portland cement clinker containing $11CaO \cdot 7Al_2O_3 \cdot CaX_2$ (hereinafter abridged as $C_{11}A_7 \cdot CaX_2$ wherein X is a halogen), $3CaO \cdot SiO_2$ solid solution (hereinafter referred to $C_3S$), $2CaO \cdot SiO_2$ solid solution (hereinafter referred to $C_2S$) and $2CaO \cdot Fe_2O_3 - 6CaO \cdot 2Al_2O_3 \cdot Fe_2O_3$ system ferric solid solution (hereinafter referred to $C_4AF$) as main components.

The range of burning temperature on manufacturing rapid hardening portland cement clinker containing calcium halo-aluminate (i.e; $C_{11}A_7 \cdot CaX_2$) varies from 10° to 60° C depending on the contents of $Al_2O_3$, $Fe_2O_3$, $SiO_2$ and the like in mixed raw materials; it is very narrow as compared with the range of burning temperature on manufacturing conventional portland cement clinker. The "range of burning temperature" means here the difference between the temperature at which the amount of free lime (hereinafter referred to F·CaO) in cement clinker becomes less than 1% by weight and the temperature just before the clinker begins to melt. On burning the mixed raw materials in a rotary kiln at higher temperature than the range of the burning temperature of clinker, molten clinker adheres and grows on the kiln wall to bring undesirable effects on the kiln operation, and moreover, $3CaO \cdot Al_2O_3$ (hereinafter referred to $C_3A$) which is an undesirable product as the composition of rapid hardening cement clinker, is formed in molten phase. When the mixed raw materials are burned at lower temperature than the range of the burning temperature, the burning reaction cannot be finished and a great amount of F·CaO remains in the clinker obtained and further, the clinker shows the dusting phenomenon on cooling since large quantities of $C_2S$ formed in the clinker transfers to the γ-phase, powdered clinker also clogs the perforated plate of clinker cooler and disturbs the operation of a rotary kiln. Rapid hardening portland cement produced from such a clinker shows deterioration of both early and later strength development.

An object of this invention is to enlarge the range of burning temperature of the mixed raw materials required to produce the clinker containing mainly $C_{11}A_7 \cdot CaX_2$, $C_3S$, $C_2S$ and less than 1% of F·CaO, not to form $C_3A$ in the clinker.

Another object of this invention is to produce rapid hardening portland cement which is quick setting and has high early strength and which can maintain to high strength development for a long time by adding hemihydrate ($CaSO_4 \cdot ½H_2O$) and anhydrite ($CaSO_4$) to the clinker.

Further and additional objects of this invention will appear from the following description.

The objects described above can be realized by burning the mixed raw materials with calcium sulfate, sulfite and/or sulfide under the condition of oxidilizing atmosphere.

It is not preferable to burn them in a reducing atmosphere, since γ—$C_2S$ is formed in the clinker which collapses to powder on cooling. (so-called dusting).

In accordance with this invention, when slaked lime or quick lime is used instead of limestone as the calcareous material, heat absorption due to decarbonation of limestone can be eliminated, so the mixed raw materials can be uniformly heated: thus, a uniformly burned clinker can be obtained. When the mixed raw materials, shaped with a pressurizing machine, are fed to the rotary kiln, they are more effectively heated by the radiation and conduction from the kiln wall and from the combustion gas than when they are fed as powder. Consequently, the mixed raw materials can be more readily and easily burned uniformly.

Figure 2:
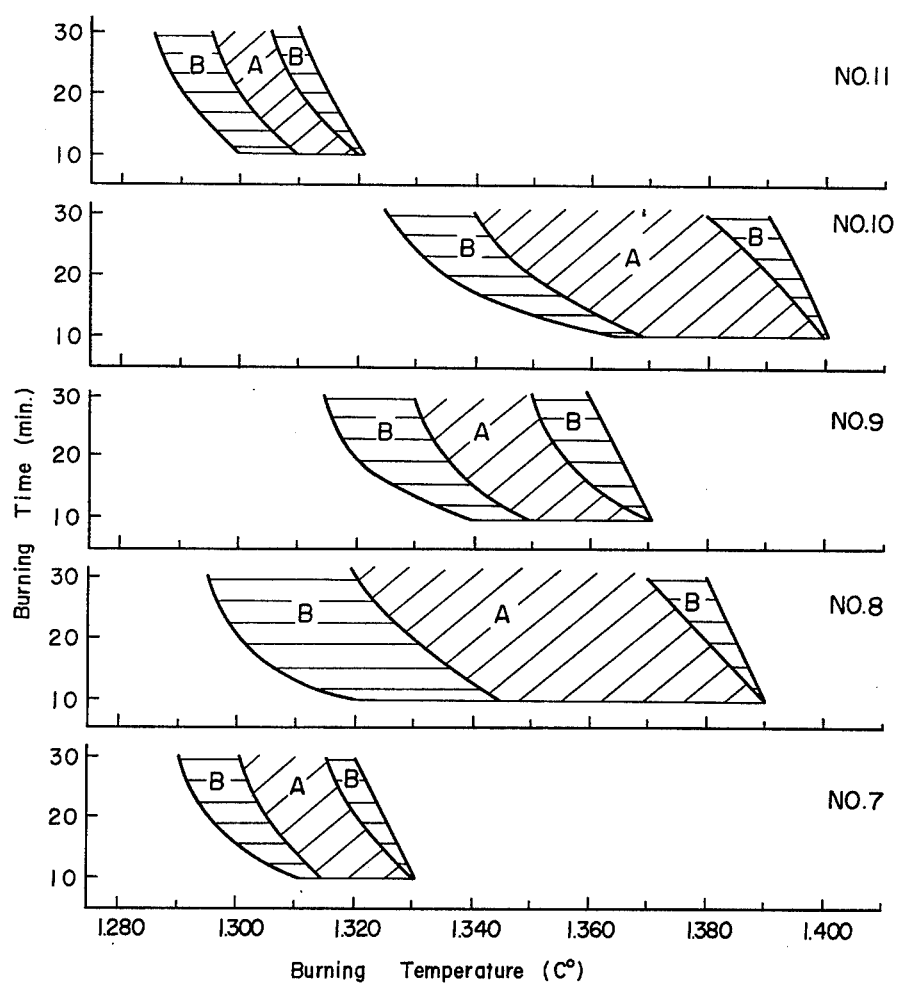

The invention will be explained by the experimental results as follows;

FIG. 1 and FIG. 2 show relation between the range of burning temperature and the burning time in which the mixed raw materials having different chemical composition are burned to produce the clinker containing less than 1.0% of F·CaO. FIG. 3 shows relation between the added amount of $SO_3$ component and the residual F·CaO in cement clinker. FIG. 4 shows relation between F·CaO in clinker and mixing ratio of limestone and quick lime used to the mixed raw materials as a calcareous material.

Figure 5:
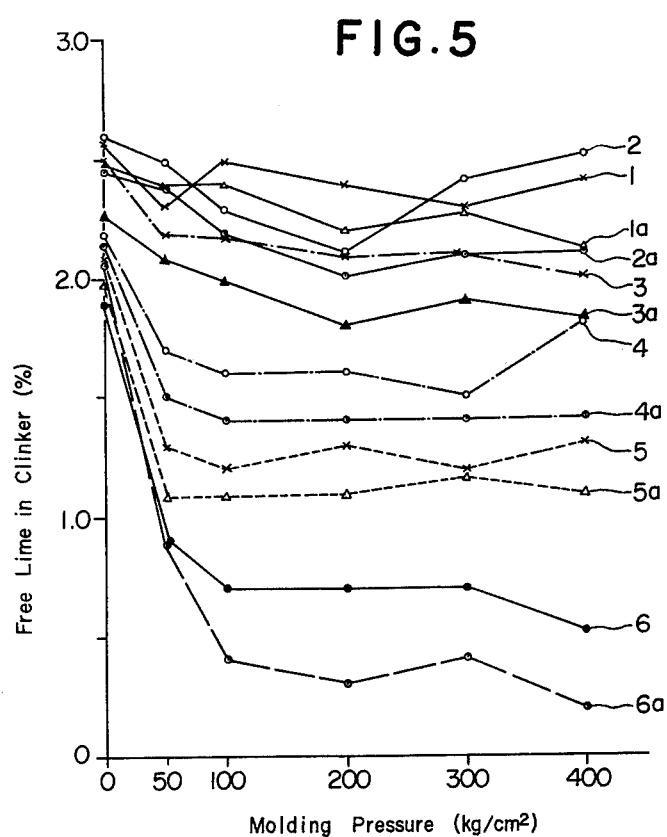

FIG. 5 shows relation between amounts of residual F·CaO in clinker and the shaping pressure of the mixed raw materials when they were used various calcareous and alumious materials with or without $SO_3$ component and burned.

In order to obtain the clinker containing $C_{11}A_7 \cdot CaF_2$, $C_3S$, $C_2S$, $C_4AF$ shown in Table 1, each amount of the raw materials was calculated from the objected mineral composition except for constant amounts of $SO_3 = 1.0\%$, $Fe_2O_3 = 2.0\%$, $MgO = 0.5\%$, $K_2O = 0.3$ and $Na_2O = 0.2\%$, supplied from pure chemicals.

There were also used calcium fluoride as calcium halide and gypsum as the $SO_3$ source. For the purpose of the comparison with before-mentioned mixed raw materials, the mixed raw materials without adding gypsum were prepared.

Calcium fluoride was added 0.3% by weight in excess of the stoichiometrical amount corresponding to the quantity of $C_{11}A_7 \cdot CaF_2$ in clinker considering the combination with alkali components in the mixed raw materials ($K_2O$, $Na_2O$) and the evaporation during burning.

The calculating equations to obtain the mineral composition in clinker are as follows;

$C_4AF = 3.043 F$
$C_{11}A_7 \cdot Ca\bar{F}_2 = 1.972 (A - 0.638 F) \quad Ca\bar{F}_2 = 0.0554 C_{11}A_7 \cdot Ca\bar{F}_2 + 1.260N + 0.829K$
$C_3S = 4.071C + 0.718 (1.260N + 0.829K) - 0.700\bar{S} - 1.405F - 0.864A - 7.602S$
$\quad = 4.071C + 3.68N + 2.42K - 2.852\bar{S} - 7.602S - 5.718F - 3.519A$
$C_2S = 2.868 ( S - 0.263 C_3S )$ (Note; C = CaO, F = $Fe_2O_3$, $\bar{F}$ = F, A = $Al_2O_3$ N = $Na_2O$, K = $K_2O$, $\bar{S}$ = $SO_3$, S = $SiO_2$ )

Table 1

Predetermined Mineral Composition of Clinker, its Chemical Composition, and Compressive Strength of Cement Mortar produced from the obtained Clinker

| No. | Mineral Composition of Clinker (%) | | | | Chemical Composition (%) | | | | | | | | | |
|---|---|---|---|---|---|---|---|---|---|---|---|---|---|---|
| | $C_3S$ | $C_2S$ | $C_{11}A_7 \cdot CaF_2$ | $C_4AF$ | $SiO_2$ | $Al_2O_3$ | $Fe_2O_3$ | CaO | MgO | $K_2O$ | $Na_2O$ | F | $SO_3$ | Total |

Table 1-continued

| No. | | | | | | | | | | | | | | |
|---|---|---|---|---|---|---|---|---|---|---|---|---|---|---|
| 1-0 | 30 | 51 | 10 | 6 | 25.6 | 6.3 | 2.0 | 64.3 | 0.5 | 0.3 | 0.2 | 0.8 | 0 | 100.0 |
| 1-1 | " | 50 | " | " | 25.0 | " | " | 63.9 | " | " | " | " | 1.0 | 100.0 |
| 2-0 | 30 | 45 | 15 | 6 | 23.9 | 8.9 | " | 63.2 | " | " | " | 1.0 | 0 | 100.0 |
| 2-1 | " | 44 | " | " | 23.3 | " | " | 62.8 | " | " | " | " | 1.0 | 100.0 |
| 3-0 | 30 | 35 | 25 | 6 | 20.3 | 14.0 | " | 61.5 | " | " | " | 1.2 | 0 | 100.0 |
| 3-1 | " | 34 | " | " | 19.7 | " | " | 61.1 | " | " | " | " | 1.0 | 100.0 |
| 4-0 | 30 | 15 | 45 | 6 | 13.2 | 24.1 | " | 57.9 | " | " | " | 1.8 | 0 | 100.0 |
| 4-1 | " | 14 | " | " | 12.6 | " | " | 57.5 | " | " | " | " | 1.0 | 100.0 |
| 5-0 | 30 | 5 | 55 | 6 | 9.6 | 29.2 | " | 56.1 | " | " | " | 2.1 | 0 | 100.0 |
| 5-1 | " | 4 | " | " | 9.0 | " | " | 55.7 | " | " | " | " | 1.0 | 100.0 |
| 6-0 | 40 | 25 | 25 | 6 | 19.4 | 14.0 | 2.0 | 62.4 | 0.5 | 0.3 | 0.2 | 1.2 | 0 | 100.0 |
| 6-1 | " | 24 | " | " | 18.8 | " | " | 62.0 | " | " | " | " | 1.0 | 100.0 |
| 7-0 | 40 | 6 | 45 | 6 | 12.2 | 24.1 | " | 58.9 | " | " | " | 1.8 | 0 | 100.0 |
| 7-1 | " | 4 | " | " | 11.6 | " | " | 58.5 | " | " | " | " | 1.0 | 100.0 |
| 8-0 | 50 | 25 | 15 | 6 | 22.0 | 8.9 | " | 65.1 | " | " | " | 1.0 | 0 | 100.0 |
| 8-1 | " | 24 | " | " | 21.4 | " | " | 64.7 | " | " | " | " | 1.0 | 100.0 |
| 9-0 | 50 | 4 | 35 | 6 | 15.9 | 19.0 | " | 60.6 | " | " | " | 1.5 | 0 | 100.0 |
| 9-1 | " | 2 | " | " | 15.3 | " | " | 60.2 | " | " | " | " | 1.0 | 100.0 |
| 10-0 | 60 | 6 | 25 | 6 | 17.7 | 14.0 | " | 64.1 | " | " | " | 1.2 | 0 | 100.0 |
| 10-1 | " | 4 | " | " | 17.1 | " | " | 63.7 | " | " | " | " | 1.0 | 100.0 |
| 11-0 | 15 | 5 | 70 | 6 | 5.6 | 36.8 | " | 52.1 | " | " | " | 2.5 | 0 | 100.0 |
| 11-1 | " | 3 | " | " | 5.0 | " | " | 51.7 | " | " | " | " | 1.0 | 100.0 |

| No. | Mineral Composition of Clinker (%) | | | | Compressive Strength (kg/cm²) | | | | | | Burning Temp. (° C) | F.CaO (%) |
|---|---|---|---|---|---|---|---|---|---|---|---|---|
| | $C_3S$ | $C_2S$ | $C_{11}A_7\text{-}CaF_2$ | $C_4AF$ | 3 h. | 6 h. | 1 day | 3 day | 7 day | 28 day | | |
| 1-0 | 30 | 51 | 10 | 6 | 12 | 30 | 40 | 98 | 124 | 92 | 1310 | 0.6 |
| 1-1 | " | 50 | " | " | 20 | 54 | 89 | 116 | 124 | 186 | | 0.2 |
| 2-0 | 30 | 45 | 15 | 6 | 15 | 50 | 60 | 78 | 109 | 111 | 1320 | 0.6 |
| 2-1 | " | 44 | " | " | 29 | 63 | 138 | 143 | 165 | 217 | | 0.2 |
| 3-0 | 30 | 35 | 25 | 6 | 30 | 64 | 102 | 168 | 203 | 264 | 1320 | 0.8 |
| 3-1 | " | 34 | " | " | 101 | 148 | 174 | 226 | 264 | 36 | | 0.2 |
| 4-0 | 30 | 15 | 45 | 6 | 103 | 198 | 264 | 326 | 365 | 373 | 1310 | 0.3 |
| 4-1 | " | 14 | " | " | 208 | 265 | 310 | 346 | 393 | 468 | | 0.1 |
| 5-0 | 30 | 5 | 55 | 6 | 184 | 238 | 297 | 309 | 288 | 368 | 1300 | 0.6 |
| 5-1 | " | 4 | " | " | 212 | 268 | 324 | 386 | 403 | 526 | | 0.3 |
| 6-0 | 40 | 25 | 25 | 6 | 60 | 114 | 218 | 233 | 246 | 222 | 1330 | 0.9 |
| 6-1 | " | 24 | " | " | 93 | 139 | 239 | 244 | 305 | 503 | | 0.3 |
| 7-0 | 40 | 6 | 45 | 6 | 108 | 174 | 304 | 354 | 357 | 373 | 1310 | 0.4 |
| 7-1 | " | 4 | " | " | 213 | 268 | 344 | 364 | 399 | 563 | | 0.2 |
| 8-0 | 50 | 25 | 15 | 6 | 40 | 57 | 76 | 156 | 249 | 338 | 1350 | 0.7 |
| 8-1 | " | 24 | " | " | 88 | 131 | 233 | 254 | 324 | 491 | | 0.1 |
| 9-0 | 50 | 4 | 35 | 6 | 124 | 188 | 248 | 258 | 270 | 284 | 1350 | 0.9 |
| 9-1 | " | 2 | " | " | 186 | 207 | 264 | 309 | 365 | 587 | | 0.3 |
| 10-0 | 60 | 6 | 25 | 6 | — | — | 32 | 199 | 293 | 336 | 1380 | 1.0 |
| 10-1 | " | 4 | " | " | — | — | 52 | 235 | 376 | 439 | | 0.4 |
| 11-0 | 15 | 5 | 70 | 6 | 482 | 513 | 507 | 480 | 469 | 472 | 1300 | 0.5 |
| 11-1 | " | 3 | " | " | 516 | 516 | 509 | 486 | 512 | 492 | | 0.1 |

Note:
1) —means that the strength could not determine.
2) The product containing no $SO_3$ all caused dusting to become powdery.
3) The $C_{11}A_7 \cdot CaF_2$ phase and the $C_3S$ phase in the obtained clinker were quantitatively determined by X-ray: the value of the $C_{11}A_7 \cdot CaF_2$ phase stayed in about ±2% to the predetermined value, but the value of the $C_3S$ phase was a little lower than the predetermined one, by 1–4%, as there were still remained F.CaO.

The compositions shown in Table 1 contain from 10–70% of calcium haloaluminate and from 15–60% of tricalcium silicate.

The mixed raw materials were ground in a pot mill, shaped under pressure of 200 kg/cm², and burned in an electric furnace for 20 minutes at predetermined temperature; then the product was ground so as to obtain a fineness of 3700 cm²/g expressed in Blaine specific surface area. Hemihydrate and anhydrite prepared by dehydration or calcination of natural crystalline gypsum having a fineness of more than 5300 cm²/g (Blaine) were added to the powdered clinker and mixed to make the cement containing 9% by weight of $SO_3$. The setting time varied depending on the mixing ratio of the hemihydrate and anhydrite, but in this experiment, the ratio was selected to make the initial setting time of the mortar almost constantly about 30 minutes; the obtained cement was subjected to the mortar strength test, according to JIS R 5202-1964 testing method.

FIG. 1 and FIG. 2 show relation between the range of burning temperature of each mixed raw material in Table 1 and the burning time. A in the figures represents the range of burning temperature when the mixed raw materials without $SO_3$ component were burned, and A + B represents the range of burning temperature when the mixed raw materials with $SO_3$ component were burned.

The range of burning temperature was determined by burning the mixed raw materials at the temperature selected with each 5° C interval for 10, 20, and 30 minutes respectively.

Enlargement of range of burning temperature brings about an easier operation of kiln on the burning of clinker and permits the manufacture of the rapid hardening portland cement clinker in an easy manner to form a commercially acceptable product. It is confirmed that the same result as mentioned-above can be obtained by using calcium chloride, calcium iodide and calcium bromide instead of calcium fluoride, and calcium sulfite and calcium sulfide instead of calcium sulfate.

In accordance with this invention, the range of burning temperature is enlarged, and more, as seen from the test results on the strength of mortar specimen shown in Table 1, the early and later compressive strength development of the mortar prepared from the clinkers containing $SO_3$ component increase and the residual F.CaO in the clinker is less as compared with that of the clinker without $SO_3$ component. The produced clinker containing SO₃ component does not show dusting due to the transformation of C₂S to γ-form and the cement having excellent properties can be produced from the clinker.

Table 2 shows the influence of the adding amount of SO₃ component in the mixed raw materials shown in Table 1, No. 6 on the strength of mortar.

Table 2

| Adding amount of SO₃ component | Compressive strength (kg/cm²) | | | | Remarks |
|---|---|---|---|---|---|
| | 3 h. | 6 h. | 1 d. | 3 d. | |
| 0.5 | 97 | 123 | 196 | 226 | |
| 1.0 | 93 | 139 | 244 | 268 | |
| 4.0 | 72 | 106 | 176 | 204 | |
| 4.5 | 64 | 97 | 168 | 200 | Formation of C₃A₃·CaSO₄ was a trace |
| 5.0 | — | — | 104 | 189 | Formation of C₃A₃·CaSO₄ was markedly |

FIG. 3 shows the effect of the adding amount of SO₃ component on residual F.CaO in the obtained clinker, which is one of the measure for judging the difficulty of burning reaction and operation. According to the results shown in Table 2 and FIG. 3, it is found that the residual amount of F·CaO in the clinker reduces with increase of the adding amount of SO₃ component, and the mixed raw materials are burned more easily but the early strength development of cement mortar produced from the clinker containing more than 5% by weight of SO₃ component is greatly reduced, since 3CaO·3Al₂O₃·CaSO₄ (hereinafter abridged as C₃A₃·CaSO₄) is formed remarkedly.

Consequently, the adding amount of SO₃ component is preferably less than 4.5%.

According to the experiment of this invention, there were used limestone, quick lime or slaked lime as the calcareous materials, crude or burned bauxite as the alumious materials, silica sand as the siliceous materials, copper slag as the iron sourse (the chemical compositions of these materials being shown in Table 3), fluoride as calcium halide, and natural crystalline gypsum as the SO₃ sources, and they were mixed to produce the clinker shown in Table 4. The degree of difficulty on burning and the properties of the obtained clinker were examined. The results are shown below.

Table 3

| | Ig.loss | Chemical Composition (wt. %) | | | | | | | | | Total |
|---|---|---|---|---|---|---|---|---|---|---|---|
| | | SiO₂ | Al₂O₃ | Fe₂O₃ | TiO₂ | | CaO | MgO | Na₂O | K₂O | |
| Crude Bauxite | 28.0 | 3.5 | 61.5 | 3.5 | 3.5 | | 2.0 | — | — | — | 100 |
| Limestone | 42.2 | 0.7 | 0.8 | 0.1 | — | | 56.0 | 0.2 | — | — | 100 |
| Silica Sand | 3.4 | 72.0 | 16.0 | 0.6 | — | | 0.1 | 0.9 | 2.3 | 3.3 | 98.6 |
| | | | | | SO₃ | ZnO | | | | | |
| Copper Slag | 1.8 | 35.7 | 4.6 | 42.9 | | 5.7 | 7.7 | 1.6 | 0.2 | 0.4 | 100.6 |

Table 4

| | Chemical Composition (wt. %) | | | | | | | | | Mineral Composition of Clinker (wt.%) | | | |
|---|---|---|---|---|---|---|---|---|---|---|---|---|---|
| | SiO₂ | Al₂O₃ | Fe₂O₃ | CaO | MgO | K₂O | Na₂O | F | Total | C₃S | C₂S | C₁₁A₇·CaF₂ | C₄AF |
| No Addition of SO₃ | 19.4 | 14.0 | 2.0 | 62.4 | 0.5 | 0.3 | 0.2 | 1.2 | 100 | 40 | 25.5 | 25 | 6.1 |
| Addition of 1% SO₃ | 18.4 | 14.0 | 2.0 | 62.0 | 0.5 | 0.3 | 0.2 | 1.2 | 100 | 40 | 23.8 | 25 | 6.1 |

Table 5

| No. | Calcareous- Material | Alumina Material | Other Material | F.CaO retention time: 20 min. | | Dusting |
|---|---|---|---|---|---|---|
| | | | | 1300 °C | 1340 °C | |
| 1 | Limestone | Crude bauxite | — | 3.6 | 2.4 | X |
| 2 | " | " | Gypsum | 2.8 | 2.2 | O |
| 3 | " | Burned bauxite | — | 3.5 | 2.1 | X |
| 4 | " | " | Gypsum | 2.5 | 2.0 | O |
| 5 | Slaked lime | Crude bauxite | — | 2.6 | 2.1 | X |
| 6 | " | " | Gypsum | 2.2 | 1.8 | O |
| 7 | " | Burned bauxite | — | 1.9 | 1.6 | X |
| 8 | " | " | Gypsum | 1.6 | 1.4 | O |
| 9 | Quick lime | Crude bauxite | — | 1.8 | 1.6 | X |
| 10 | " | " | Gypsum | 1.4 | 1.3 | O |
| 11 | " | Burned bauxite | — | 1.3 | 0.6 | X |
| 12 | " | " | Gypsum | 0.9 | 0.3 | O |

Note:
X shows collapse
O shows no collapse

The mixed raw materials were prepared with or without gypsum by combining quick lime or slaked lime as the calcareous materials with crude or burned bauxite as the aluminous materials respectively F·CaO in the resultant clinker was determined. The results are shown in Table 5. In this experiment, the mixed raw materials were shaped under the pressure of 200 kg/cm² to form chips of 15mm. in diameter and 30mm. in height, which were burned in an electric furnace at 1300° and 1340° C for 20 minutes.

As seen in Table 5, when using quick lime as the calcareous materials, residual F·CaO in the obtained clinker was less as compared with using slaked lime or limestone and when using slaked lime as the calcareous materials, F·CaO in the clinker was less as compared with using limestone, and when using burned bauxite as the aluminous materials. F·CaO in the clinker was less as compared with using crude bauxite and burning of the mixed raw materials became more easily in the above-mentioned order.

FIG. 4 shows relation between the amount of F·CaO in clinker and mixing ratio of limestone and quick lime, when limestone and quick lime were used as the calcareous materials. According to FIG. 4, the amount of F·CaO in the clinker greatly reduced when more than 60% of quick lime was used as a calcareous material in the mixed raw materials, and the amounts of F.CaO in the clinker was the same as that obtained by using quick lime only.

FIG. 5 shows relation between the shaping pressure and the amount of F.CaO in clinker when various mixture of raw materials were shaped and burned at 1340° C for 20 minutes. In FIG. 5, 1, 1a, 2 and 2a represent (limestone + crude bauxite), (limestone + crude bauxite + gypsum), (limestone + burned bauxite), and (limestone + burned bauxite + gypsum), respectively; 3, 3a, 4 and 4a represent (slaked lime + crude bauxite), (slaked lime + crude bauxite + gypsum), (slaked lime + burned bauxite) and (slaked lime + burned bauxite) and (slaked lime + burned bauxite + gypsum); 5, 5a, 6 and 6a represent (quick lime + crude bauxite), (quick lime + crude bauxite and gypsum), (quick lime + burned bauxite) and (quick lime + burned bauxite + gypsum).

In FIG. 5 it is found that the amount of F·CaO in the clinker obtained reduced at higher shaping pressure than 50 kg/cm$^2$ and the burning reaction of the mixed raw materials was improved.

When the mixed raw materials with SO$_3$ component were burned, the amount of F·CaO in the clinker produced decreased more greatly in case of using burned bauxite and quick or slaked lime than in the case of using limestone and burned or crude bauxite as described in the above experimental results. When the mixed raw materials without SO$_3$ component were burned, the clinker produced was collapsed to powder on the cooling in most case, and the strength development of the mortar produced from the clinker was deteriorated.

In accordance with this invention, the range of burning temperature is enlarged by adding 0.5 – 4.5% by weight based on SO$_3$ in calcium sulfate, sulfite or sulfide and the mixed raw materials are well burned and the clinker obtained does not show dusting on cooling and does not clog the perforated plate of the clinker cooler. Rapid hardening portland cement is prepared by grinding the clinker and adding a mixture of hemihydrate and anhydrite.

The total amounts of hemihydrate and anhydrite in the cement are 0.7 – 1.8 by Al$_2$O$_3$/SO$_3$ weight ratio and the suitable amount of hemihydrate is 0.1 – 5% by weight based on SO$_3$. The later strength development of rapid hardening Portland cement produced by this method is higher than that of normal portland cement, and maintain for a long period without deterioration.

In accordance with one embodiment of this invention, it is preferable to use quick lime or slaked lime as the calcareous materials and burned bauxite or crude bauxite as the aluminous materials in the mixed raw materials, that is, there are used quick lime-burned bauxite, quick lime-crude bauxite, or slaked lime-burned bauxite; and to add calcium sulfate, sulfite or sulfide as the SO$_3$ source, silicious material and calcium halide, and to shape the mixed raw materials under higher pressure than 50 kg/cm$^2$ and to burn them. Thus, the burning reaction may be carried out favorably, since the range of burning temperature can be enlarged, compared with the case wherein limestone-burned bauxite, limestone- crude bauxite, or slaked lime-crude bauxite is used but gypsum is not added.

The above explanation is chiefly as to the method for manufacturing clinker containing C$_{11}$A$_7$.CaF$_2$, but the clinker containing calcium-halo-aluminates except of C$_{11}$A$_7$.CaF$_2$ i.e., chloro-, bromo-, and iodo-aluminate are used in this invention, but the clinker containing bromo-aluminate and iodo-alminate are too expensive to be used practically.

EXAMPLE 1

The ground raw materials having the composition shown in Table 6 such as white clay, gypsum (added to raw materials to contain 1% based on SO$_3$ in the clinker), quick lime, fluolite, white bauxite and copper slag were mixed in order to obtain the clinker which have the composition shown in Table 7. The mixed raw materials were shaped under the pressure (about 300 kg/cm$^2$) with a rotary roll press provided with deaeration hopper to obtain flakes about 1cm. in thickness. The flakes were continuously fed to a 0.5m ×3m rotary kiln with the rate of 10 kg/h., and burned at 1310°–1360° C (hereinafter burning temperature is expressed in the clinker at the burning zone): there was not observed the melting of the clinker and adhereing to the kiln well, and burning of the clinker was carried out favorably and readily, the clinker was cooled without dusting.

The clinker contained 0.3% of F·CaO (determined by the ammonium acetate method), and 25.2% of C$_{11}$A$_7$.CaF$_2$ and 44.8% of C$_3$S by weight respectively (determined by X-ray diffraction method). C$_3$A was not exited.

The clinker was ground to have Blaine specific surface area of 3700 cm$^2$/g. 85 weight parts of the ground clinker, 3 weight parts of hemihydrate and 12 weight parts of anhydrite were added to make the rapid hardening portland cement, which was subjected to the mortar test (according to JIS R 52011964).

The results are shown in Table 8.

Table 6

| Raw Material | Ig.loss | SiO$_2$ | Al$_2$O$_3$ | Fe$_2$O$_3$ | CaO | MgO | SO$_3$ | Na$_2$O | K$_2$O | TiO$_2$ | Total | Fineness of powder Residue of 88$\mu$ sieve |
|---|---|---|---|---|---|---|---|---|---|---|---|---|
| White Clay | 4.3 | 73.8 | 20.3 | 0.3 | 0.5 | 0.1 | — | 0.2 | 0.3 | — | 99.8 | 1.1 |
| Gypsum | 1.9 | 2.8 | 0.8 | 0.1 | 43.1 | 0.2 | 51.2 | 0.1 | tr | — | 100.2 | 1.0 |
| Limestone | 42.2 | 0.7 | 0.8 | 0.1 | 56.0 | 0.2 | — | — | — | — | 100.0 | 1.8 |
| Quick lime | 4.5 | 4.1 | 1.2 | 0.7 | 88.5 | 1.0 | — | — | — | — | 100.0 | 1.6 |
| Fluolite | 6.1 | 23.1 | 4.1 | 1.6 | 44.1 | 1.2 | — | 0.1 | 0.7 | 23.4 (F) | 104.4 | 1.0 |
| White bauxite | 0.4 | 10.0 | 85.9 | 1.2 | tr | 0.1 | — | 0.1 | 0.1 | 2.7 (ZnO) | 100.5 | 1.2 |

Table 6-continued

| Raw Material | Ig.loss | Chemical Composition (wt. %) | | | | | | | | | Total | Fineness of powder Residue of 88μ sieve |
|---|---|---|---|---|---|---|---|---|---|---|---|---|
| | | $SiO_2$ | $Al_2O_3$ | $Fe_2O_3$ | CaO | MgO | $SO_3$ | $Na_2O$ | $K_2O$ | $TiO_2$ | | |
| Copper slag | — | 35.7 | 4.6 | 42.9 | 7.7 | 1.6 | 1.8 | 0.2 | 0.4 | 5.7 | 100.6 | 2.0 |

Table 7

| Chemical Composition of Clinker (wt. %) | | | | | | | Remarks |
|---|---|---|---|---|---|---|---|
| $SiO_2$ | $Al_2O_3$ | $Fe_2O_3$ | CaO | F | $SO_3$ | Total | |
| 18.8 (19.4) | 14.0 | 2.0 | 62.0 (62.4) | 1.2 | 1.0 (—) | 99.0 | Figures in the parenthesis are values when gypsum was not added |

Table 8

| | Strength of Mortar (kg/cm²) | | | | | | Remarks |
|---|---|---|---|---|---|---|---|
| | 3 hr | 6 hr | 1 day | 3 day | 7 day | 28 any | |
| Example 1 | 112 (31.2) | 168 (40.5) | 220 (43.2) | 280 (50.3) | 367 (72.7) | 491 (99.1) | Mortar on kneading was very plastic. |
| Comparative Example 1 | 64 (18.1) | 124 (32.4) | 185 (39.6) | 236 (42.3) | 256 (44.6) | 268 (44.5) | |

Note:
Figures show values of compressive strength.
Figures in the parenthesis show values of bending strength.

Comparative Example 1

The mixed raw materials without gypsum for preparing the clinker having the composition in Table 7, were shaped with pressure under the same conditions as that described in Example 1, and burned at 1330° – 1350° C; the produced clinker did not melt nor adhere on the kiln wall, but the clinker showed dusting on the cooling.

The clinker composition was 0.5% of F·CaO, 24.8% of $C_{11}A_7 \cdot CaF_2$ and 43.5% of $C_3S$, and formation of $C_3A$ was not observed. (The testing methods in this experiment and in those described hereinafter were similar to those described in Example 1.)

The clinker was ground and hemihydrate and anhydrite were added to the clinker to produce rapid hardening portland cement as well as in Example 1.

The results of the mortar test are shown in Table 8; the compressive and the bending strength of the mortar were found to be lower than that of the mortar obtained in Example 1 at both early and later period.

Example 2

All amount of quick lime used to the mixed raw materials as a calcareous material, shown in Example 1, was substituted with limestone in Table 6, and each raw material was mixed so as to obtain the same clinker composition as that in Example 1.

The mixture was shaped to pellets of 5 – 20mm. in diameter by a pan pelletizer, on the burning at 1320° – 1330° C in a kiln under the same condition as in Example 1. Some pellets were broken during the burning and there was obtained the clinker containing 20.6% of $C_{11}A_7 \cdot CaF_2$, 43.0% of $C_3S$, 5.3% of $C_3A$ and 0.9% of F·CaO.

The obtained clinker was ground and hemihydrate and anhydrite were added to the clinker to produce rapid hardening portland cement as well as in Example 1. The results of mortar test are shown in Table 9.

Table 9

| | Strength of Mortar (kg/cm²) | | | | | | Remarks |
|---|---|---|---|---|---|---|---|
| | 3 hr | 6 hr | 1 day | 3 day | 7 day | 28 day | |
| Example 2 | 54 (16.3) | 123 (34.4) | 204 (41.6) | 214 (42.2) | 254 (45.3) | 398 (80.8) | |
| Comparative Example | 48 (14.1) | 64 (17.6) | 87 (20.4) | 154 (32.6) | 185 (40.4) | 180 (41.4) | On kneading the mortar was not viscous but tended to coagulate instantly |

Note:
Figures show values of compressive strength.
Figures in the parenthesis show values of bending strength.

Comparative Example 2

Pellets were produced from the same materials as that in Example 2, but gypsum being not added, and their composition was the same as that in Comparative Example 1, and burned at 1340° – 1370° C. some pellets were broken or melt, and the stability in burning operation was inferior to that in Example 2. The burning temperature fluctuated greatly which make the burning operation to be difficult. All the obtained clinker showed the dusting on cooling.

The clinker contained 14.3% of $C_{11}A_7 \cdot CaF_2$, 41.2% of $C_3S$, 10.8% of $C_3A$ and 1.2% of F·CaO.

Rapid hardening portland cement was prepared from the clinker, similarly as described in Example 2.

The results of the mortar test are shown in Table 9, and are inferior to those obtained in Example 2.

Example 3

Red bauxite (burned bauxite) and slaked lime having the composition shown in Table 10, white clay, gypsum (1% as $SO_3$ based on the clinker), fluolite, and copper slag in Table 6 were mixed so as to obtain a clinker containing 40% of $C_{11}A_7 \cdot CaF_2$ and 38% of $C_3S$. The mixed raw materials were shaped under the pressure as described in Example 1. The flakes of mixed raw materials were fed to a rotary kiln and burned at 1310° – 1340° C. The raw flakes could be uniformly heated and the clinker produced were not melted not adhered on the kiln wall. The burning operation was carried out favorably, and dusting of the clinker was never seen on cooling.

Table 10

| | Ig.loss | SiO$_2$ | Al$_2$O$_3$ | Fe$_2$O$_3$ | CaO | MgO | SO$_3$ | Na$_2$O | K$_2$O | TiO$_2$ | Total | Residue of 88 μ (%) |
|---|---|---|---|---|---|---|---|---|---|---|---|---|
| Red bauxite (burned) | 1.0 | 4.8 | 86.1 | 6.2 | 0.1 | — | — | — | — | 2.1 | 100.3 | 1.0 |
| Slaked lime | 24.2 | 1.4 | 0.8 | 0.6 | 69.7 | 5.2 | — | — | — | — | 97.9 | 1.8 |

Note: Other materials in Table 6 were used beside the above materials.

The obtained clinker contained 39.8% of $C_{11}A_7 \cdot CaF_2$, 38.4% of $C_3S$ and 0.5% of F·CaO, and formation of $C_3A$ was not observed.

80 weight parts of the clinker (Blaine specific surface area of 3700 cm²/g, were mixed with 5 parts of hemihydrate and 15 weight parts of anhydrite ground previously and the mortar test was carried out as described in Example 1: the results are shown in Table 12.

Comparative Example 3

The raw materials shown in Example 3 were mixed so as to obtain a clinker containing 40% of $C_{11}A_7 \cdot CaF_2$ and 38% of $C_3S$ without gypsum, shaped under the pressure similarly as described in Example 3, and burned in a rotary kiln: thus the clinker could be burned favorably, but the clinker showed the dusting on cooling.

The mineral composition of the clinker was 39.4% of $C_{11}A_7 \cdot CaF_2$, 37.8% of $C_3S$ and 0.7% of F.CaO. The clinker was ground, hemihydrate and anhydrite were added to the clinker and the resultant cement was subjected to the mortar test as described in Example 3.

The results are shown in Table 11.

Table 11

| | Strength of Mortar (kg/cm²) | | | | | |
|---|---|---|---|---|---|---|
| | 3 hr | 6 hr | 1 day | 3 day | 7 day | 28 day |
| Example 3 | 198 | 240 | 268 | 328 | 378 | 546 |
| | (43.9) | (45.6) | (48.6) | (53.7) | (71.3) | (104) |
| Comparative Example 3 | 107 | 154 | 212 | 254 | 274 | 281 |
| | (32.5) | (40.9) | (44.2) | (47.8) | (50.1) | (53.6) |

Note: Figures show values of compressive strength. Figures in the parenthesis show values of blending strength.

EXAMPLE 4

In the composition of the mixed raw materials shown in Example 3, amount of slaked lime was substituted with limestone, and the mixed raw materials were shaped to pellets of 5 – 20mm. in diameter by a pan pelletizer, similarly as described in Example 2. The pellets were continuously fed to a rotary kiln and burned at 1290° – 1340° C, there was observed hunching in the temperature of the burning zone due to heat absorption by decarbonation of limestone in the mixed raw materials, but such a hunching was recovered by slowing down the rotation of kiln. The surface of the clinker obtained partly melted, and some amount of $C_3A$ was present in the clinker. The clinker contained 37.5% of $C_{11}A_7 \cdot CaF_2$, 34.0% of $C_3S$ and 0.9% of F·CaO.

The clinker was ground, hemihydrate and anhydrite were added to the clinker similar to those described in Example 3. The resultant cement was subjected to the mortar test and the results are shown in Table 13.

Comparative Example 4

The raw material described in Example 3 were mixed without adding gypsum to obtain the same mineral composition of clinker described in Comparative Example 3, and shaped to pellets similarly as described in Example 4. The pellets were burned in a rotary kiln at 1300° – 1350° C, but since the burning temperature of clinker was not maintained stably, such amounts of molten clinker were found in the obtained clinker, which showed the dusting on cooling. The clinker contained 31.4% of $C_{11}A_7 \cdot CaF_2$, 32.7% of $C_3S$, of $C_3A$, and 1.9% of F·CaO.

The cement was prepared from this clinker as described in Example 4, and the mortar test thereof was tried out: the results are shown in Table 12.

Table 12

| | Strength of Mortar (kg/cm²) | | | | | |
|---|---|---|---|---|---|---|
| | 3 hr | 6 hr | 1 day | 3 day | 7 day | 28 day |
| Example 4 | 84 | 164 | 203 | 244 | 298 | 373 |
| | (18.6) | (25.8) | (38.6) | (50.1) | (63.5) | (71.6) |
| Comparative Example 4 | 54 | 68 | 124 | 180 | 205 | 224 |
| | (14.7) | (17.5) | (31.4) | (38.9) | (41.5) | (39.7) |

Note;
Figures show values of compressive strength.
Figures in the parenthesis show values of bending strength.

Example 5

An amount of $CaF_2$ and gypsum used to the mixed raw materials in Example 1 were substituted with $CaCl_2$ and $CaSO_3$, respectively, and the mixed materials were burned at 1330° – 1400° C.

The obtained clinker contained 0.2% of F·CaO, 24.7% of $C_{11}A_7 \cdot CaCl_2$ and 41.6% of $C_3S$ and $C_3A$ was not contained in the clinker.

The cement was prepared from this clinker and the mortar test thereof was tried out; the results are shown in Table 14.

Table 13

| | | Strength of Mortar (kg/cm²) | | | |
|---|---|---|---|---|---|
| 3 hr | 6 hr | 1 day | 3 day | 7 day | 28 day |
| 120 (32.2) | 154 (36.9) | 216 (42.2) | 306 (54.3) | 339 (62.7) | 484 (86.1) |

Note:
Figures show values of compressive strength.
Figures in the parenthesis show values of bending strength.

Example 6

An amount of gypsum used to the mixed raw materials in Example 1 was substituted with CaS and the mixed raw materials were burned at 1310 – 1340° C.

The obtained clinker contained 0.3% of F.CaO, 25.0% of $C_{11}A_7 \cdot CaF_2$ and 45.0% of $C_3S$ and $C_3A$ was not contained in the clinker.

The cement was prepared from this clinker and the mortar test thereof was tried out; the results are shown in Table 14.

Table 14

| | | Strength of Mortar (kg/cm²) | | | |
|---|---|---|---|---|---|
| 3 hr | 6 hr | 1 day | 3 day | 7 day | 28 day |
| 133 (40.5) | 166 (42.4) | 214 (46.6) | 237 (49.8) | 328 (72.4) | 445 (83.3) |

Note:
Figures show values of compressive strength.
Figures in the parenthesis show values of bending strength.

What is claimed is:

1. A process for manufacturing rapid hardening portland cement which comprises adding calcium sulfate hemihydrate and anhydrite to a clinker containing 10 – 70% by weight of $11CaO \cdot 7Al_2O_3 \cdot CaX_2$, wherein X is a halogen, 15 – 60% by weight of $3CaO \cdot SiO_2$ and less than 1% by weight of free CaO which clinker is prepared by adding 0.5 – 4.5% by weight based on $SO_3$ of at least one sulfur compound selected from the group consisting of calcium sulfate, calcium sulfite and calcium sulfide to mixed raw materials which comprise an aluminous material, a calcareous material, a siliceous material, an iron source and a halogen source; and burning the obtained mixture at the temperature of 1265° – 1400° C in an oxidizing atmosphere, wherein said calcium sulfate hemihydrate and anhydrite are added in an amount such that the weight ratio of $Al_2O_3/SO_3$ in the cement is present in a range of 0.7 – 1.8.

2. A process claimed in claim 1, in which said halogen source is a fluorine source.

3. A process of claim 2, wherein the fluorine source is calcium fluoride.

4. A process claimed in claim 1, in which said halogen source is a chlorine source.

5. A process claimed in claim 1, in which the calcareous material is at least one member selected from the group consisting of quick lime and slaked lime.

6. A process claimed in claim 1, in which the calcareous mixture is a mixture of more than 60% by weight of quick lime and less than 40% by weight of limestone.

7. A process claimed in claim 1, in which the aluminous material burned is bauxite.

8. A process claimed in claim 1, in which the calcareous material is at least one member selected from the group consisting of quick lime and slaked lime and the aluminous material is at least one member selected from the group consisting of crude bauxite and burned bauxite.

9. A process of claim 1, in which the mixed raw materials are shaped under a pressure greater than 50 Kg/cm².

* * * * *